United States Patent [19]

Wilbourn

[11] 4,065,822

[45] Jan. 3, 1978

[54] SINGLE POINT MOORING WITH STRAIN RELIEF ANCHORING

[75] Inventor: James P. Wilbourn, New Orleans, La.

[73] Assignee: Texaco Inc., New York, N.Y.

[21] Appl. No.: 661,915

[22] Filed: Feb. 27, 1976

[51] Int. Cl.² ............................................. B63B 21/52
[52] U.S. Cl. ......................................... 9/8 P; 114/230
[58] Field of Search ............................. 9/8 P; 114/230

[56] References Cited

U.S. PATENT DOCUMENTS

| 3,372,410 | 3/1968 | Hindman et al. | 9/8.3 R |
| 3,465,374 | 9/1969 | Johnson et al. | 9/8 P |
| 3,708,811 | 1/1973 | Flory | 9/8 P |
| 3,894,567 | 7/1975 | Mott | 9/8 P |

FOREIGN PATENT DOCUMENTS 1,963,589  12/1968  Germany .................................. 9/8 P Primary Examiner—Trygve M. Blix
Assistant Examiner—Gregory W. O'Connor
Attorney, Agent, or Firm—Thomas H. Whaley; Carl G. Ries; Robert B. Burns

[57] ABSTRACT

A single point mooring for an offshore body of water, being capable of holding a tanker during a loading or off-loading period. A conduit depending downwardly from the floating mooring to the ocean floor carries fluid from a source thereof. A resilient, shock absorbing member depending from the conduit by a plurality of buoyant connectors, takes up possible strain when the buoy is subjected to excessive lateral displacement due to wind, tide, or other phenomena.

2 Claims, 5 Drawing Figures

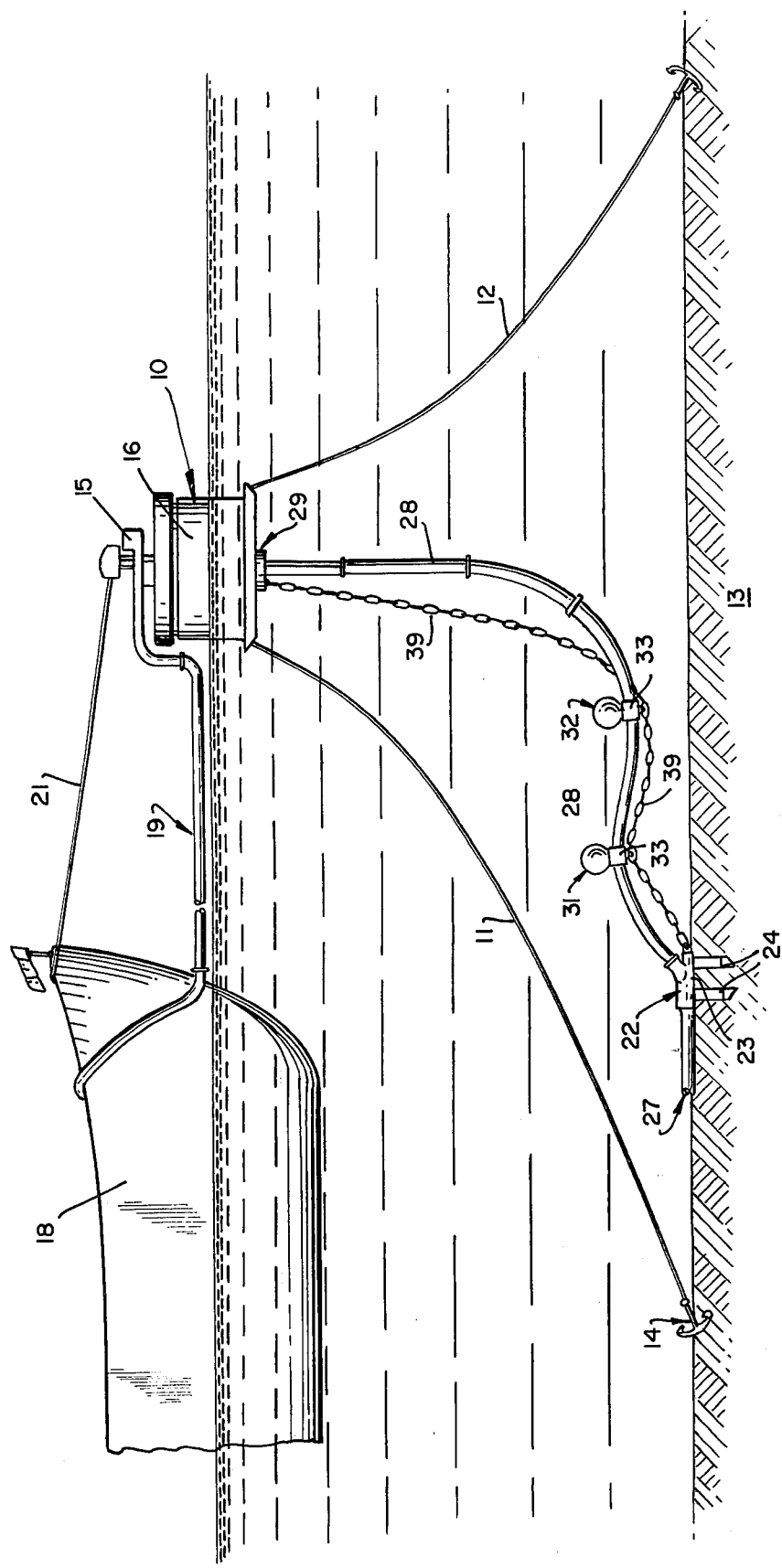

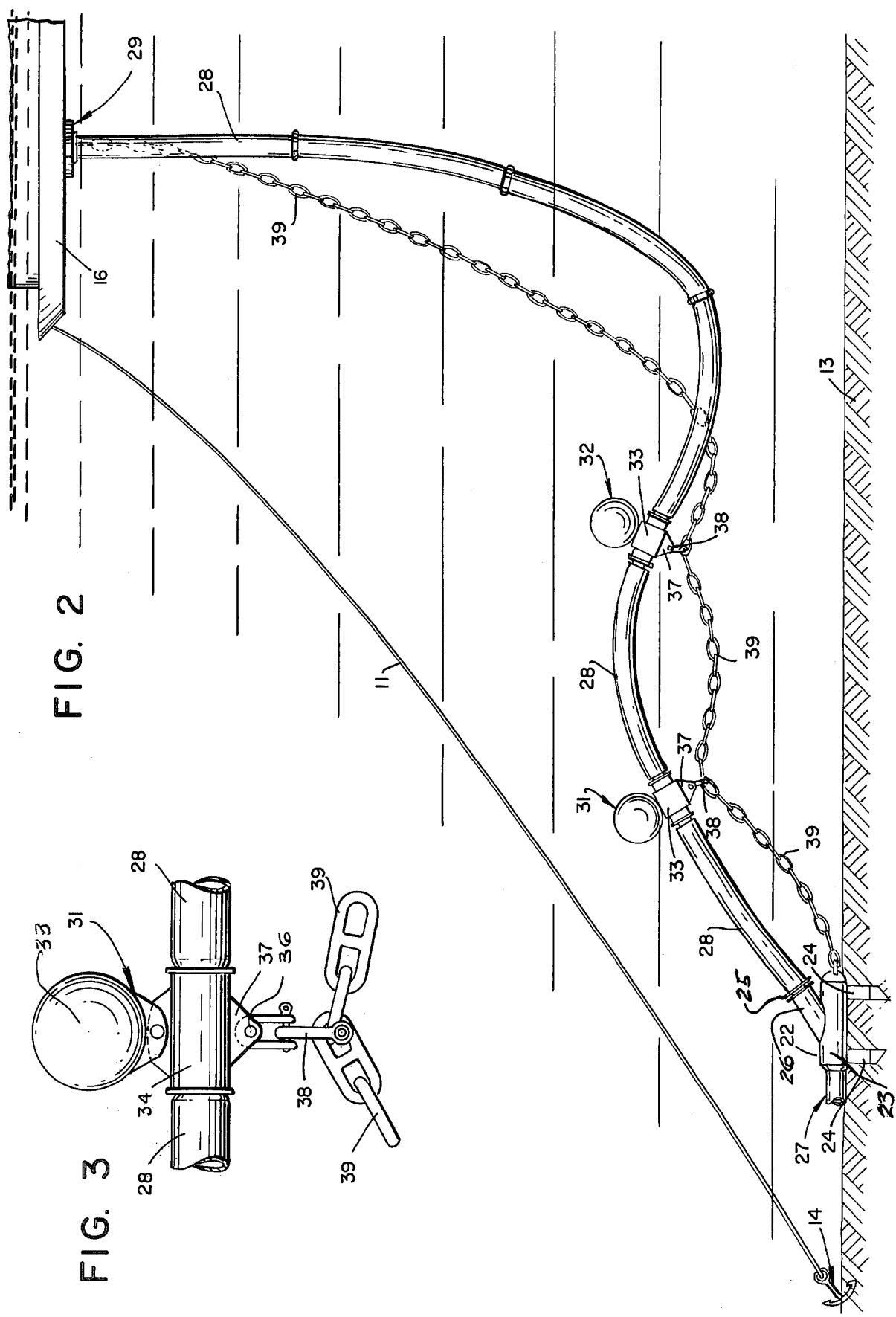

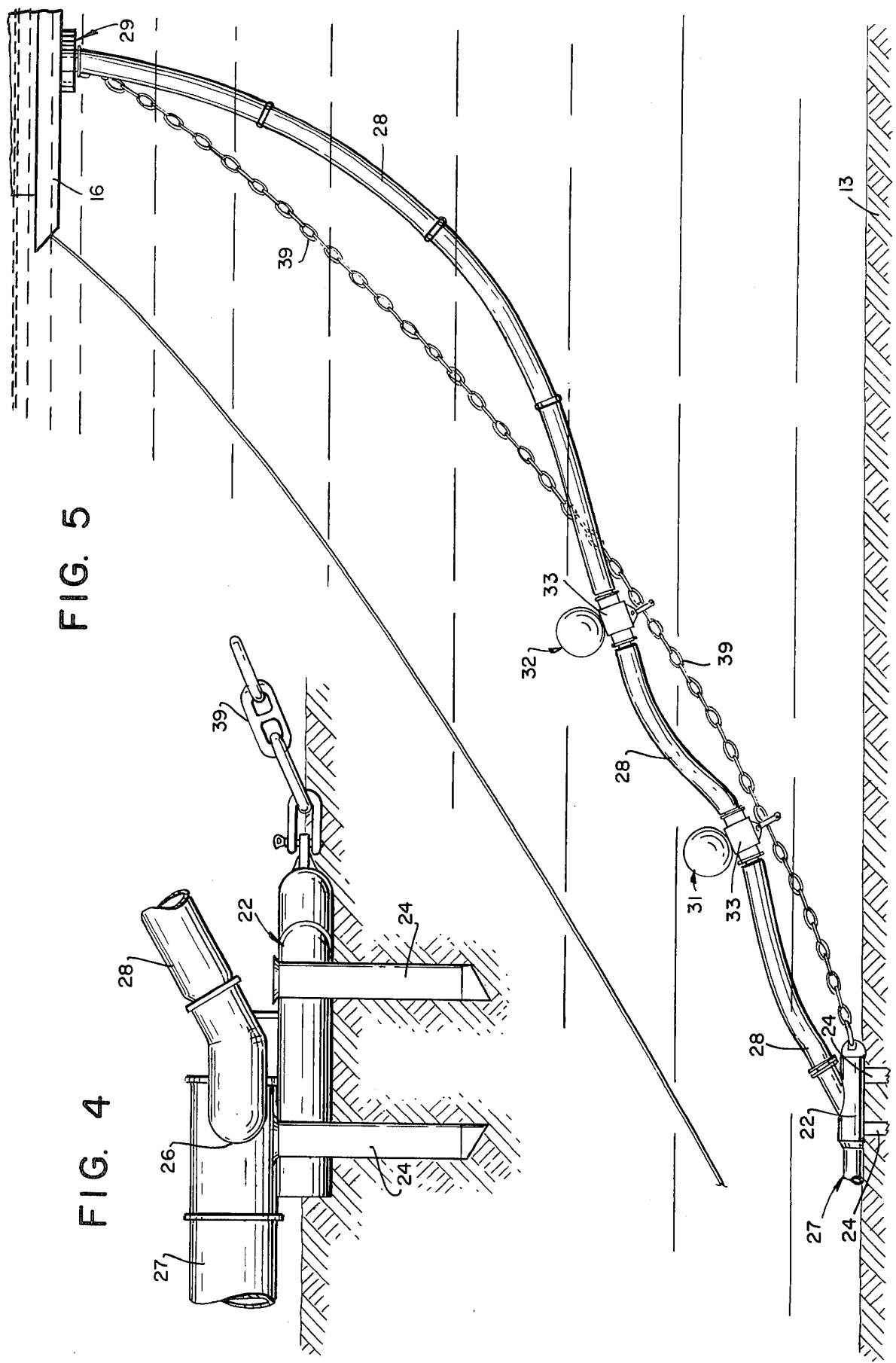

SINGLE POINT MOORING WITH STRAIN RELIEF ANCHORING

BACKGROUND OF THE INVENTION

In many offshore locations it is necessary to utilize single point moorings for holding tankers and similar vessels during loading and offloading periods. This is mandated due to the relatively shallow waters in which many terminals are located in contrast to the deep draft of the tankers.

Normally, in a single point mooring the latter is provided with means for maintaining the tanker in a desired loading area while simultaneously permitting the operation. Thus, the single point mooring comprises a floating member or buoy at the surface of the water which is positioned by a suitable anchoring arrangement. Conduit means extending from the shore, usually in the form of a pipeline, extends upwardly through a flexible conduit to the buoy, to carry fluid thereto. The buoy itself is provided with means for both restraining the tanker and for permitting connection by one or more flexible conduits to the tanker storage tanks.

A prevalent problem with respect to this type of mooring is that it is relatively fragile insofar as its holding capacity is concerned. In the instance of large cargo carriers the latter exert a relatively heavy force when they are moored during a loading or unloading operation. This force, when accentuated by bad weather in the form of high waves, wind and tide, is often in excess of what the buoy is capable of holding.

It has been found that on occasion the anchoring means, when under excessive displacing forces, will pull loose from the ocean floor or even break. This unfortunate circumstance will permit the buoy to adjust in response to the force exerted thereon. This action can of course prove damaging to the flexible conduit which carries fluid between the ocean floor and buoy, which could in turn lead to the leakage of such fluids into the water. The resulting pollution or safety problem created thereby can be extremely dangerous. The degree of danger will depend on the nature of the fluid that is being leaked and the severity of the damage or break in the conduit.

It is therefore an object of the present invention hereinafter described to provide a single point mooring which is capable of absorbing a certain amount of physical shock to which the buoy is subjected at such time as it is laterally displaced by an extraordinary force. A further object is to provide fluid conductors which connect to the buoy and which are supplemented by a strain relief member capable of relieving the conduit of excessive strain which is imposed by the displaced buoy. A still further object is to provide a vessel mooring having a strain relief means incorporated therein which permits the buoy to be displaced and yet which avoids excessive wear upon the strain relief member which would otherwise be experienced due to the continuous movement of the buoy within its normal variations.

DESCRIPTION OF THE DRAWINGS

FIG. 1 is an elevation view showing the instant mooring connected to a floating vessel.

FIG. 2 is an enlarged view showing only the mooring.

FIG. 3 is an enlarged view showing the mooring terminal.

FIG. 4 is an enlarged view of the conduit float supports.

FIG. 5 is similar to FIG. 2, showing the mooring being displaced.

Referring to FIG. 1, a single point mooring 10 of the type contemplated is shown positioned in a body of water including a plurality of anchoring members 11 and 12 extending to the ocean floor 13. Said anchoring member include in one form an anchor 14 or pile, which is embedded and which is connected to the floating buoy 16 through an elongated cable, chain, or similar heavy line.

A floating vessel 18 is connected at its forward end to the buoy 16 in such manner that fluid being conducted to the latter will be further transferred to the vessel's storage tanks.

The floating portion of the single point mooring 10 comprises in essence the generally circular buoy member 16. The latter embodies inbuilt buoyancy which will permit it to maintain a floating disposition in a desired water depth at a particular offshore location. The buoy itself includes not only flotation means, but is adapted to withstand severe contact with the vessel 18 in a situation which can occur during the course of the vessel being attached to, or becoming attached to the buoy.

To facilitate the loading or offloading operation between the buoy 16 and vessel 18, the buoy is provided with a plurality of loading connections 15 which are adapted to communicate with the vessel through a loading conductor 19. The latter is normally provided with flotation means either inbuilt into the conductor, or externally connected thereto, which would permit it to float at the water's surface.

Since vessel 18 will be subjected to the normal movement of wind, tides and the like, flow connections 15 are such that they will remain operable even though the vessel swings about the mooring point several times during the course of a day or a loading period. Thus, both mooring lines 21 as well as the fluid connections 15, are so arranged on the buoy 16 that they are flexible to the point of being automatically adjusted or oriented in accordance with the position of the vessel.

The floating buoy 16 is positioned at a desired area by the plurality of anchoring rodes or members 11 and 12 which extend from the buoy, down to the ocean floor. They are connected to the embedded anchor or pile 14. Said anchoring rodes are peripherally located about buoy 16. Thus, although the buoy is afforded a degree of lateral movement it will nonetheless be restrained by at least half the anchoring rodes regardless to which side the vessel is caused to swing. Normally, the anchoring rodes consist of stranded cables or sufficiently strong chains.

Referring to FIG. 3, a terminal member 22 positioned at the floor of the body of water includes a base 23 which is fixedly positioned by a suitable anchoring means, such as embedded piles 24. The latter are normally driven into the ocean floor to maintain the terminal in a stationary position. Terminal 22 is provided with a manifold 26 into which fluid from a pipeline 27 or similar means is brought. Normally the terminal 22 is provided with a plurality of conduits and connections such that several fluids can be moved simultaneously through the terminal, as well as through buoy 16. For the present purpose however, single incoming and outflowing conduits are shown to illustrate the invention.

In the present arrangement a single, nonrigid fluid carrying conduit 28 is shown which is connected to manifold 23 at coupling 25, and which extends upwardly to buoy 16. It is then attached through a coupling 29 which allows the buoy to move about in the water without causing damage to the conduit. The conduit 28 itself comprises preferably a plurality of individual segments which are sequentially interconnected, and which are individually provided with a sufficient degree of flexibility to permit the desired movement.

A plurality of flotation members 31 and 32 are disposed along flexible conduit 28. Said members are so spaced as to preferably maintain conduit 28 above the floor of the body of water. This can be relatively important particularly in areas where the ocean floor is comprised of sand or similar material which, when brought into contact with the conduit, would tend to abrade and wear away the surface thereof. Thus, flotation members 31 and 32 as shown comprise in essence a float 33 of sufficient size to provide the necessary degree of uplift to the conduit. Float 33 can be formed, as shown, of a metallic enclosure, or any of a number of embodiments which are commercially available. Said member can be either hollow, or filled with a suitable light weight foamed material to provide the necessary uplift for the flexible conduit 28. A sleeve 34 depends from float 33 by a pin 36 at a pivot joint. The underside of sleeve 34 is provided with a bracket 37 having a shackle 38 mounted thereto which is adapted to support a strain relieving tension member 39.

Said tension member 39 as mentioned, can embody any of several materials although preferably it is formed of a relatively heavy stranded cable or chain. The cable will have a sufficient degree of resiliency such that it can conform approximately to the shape of conduit 28. However, it will also embody a sufficient amount of resiliency so that it will stretch slightly in response to an excessive load applied thereto.

In either instance, strain member 39 is loosely supported at the respective spaced apart flotation points 31 and 32. This will permit the member, along much of its length, to conform approximately to the configuration of the conduit at the latter moves through its various positions and configurations in response to movement of buoy 16.

As shown, particularly in FIGS. 2 and 5, the buoyant floats 33 are of sufficient capacity to normally hold the flexible conduit member off the ocean floor while simultaneously supporting strain relief member 39 from the floor. This fosters the two desirable features of maintaining the flow passage through conduit 28, and also maintaining the conduit from contact with the ocean floor.

As shown in FIG. 2 the buoy 16, when in its unstrained, undisplaced position, is disposed substantially above terminal 22 so that all the restraining forces are applied to the anchor rodes on one side of the buoy. The remaining anchoring members will be eased and subject to no appreciable strain.

However, and referring to FIG. 5, as buoy 16 becomes further displaced due to excessive stretching of the anchor rode 11, or to displacement of the anchor 14 from its fixed position, or even due to the breaking of either the anchor or the rode, buoy 16 and conduit 28 will likewise adjust.

In such an instance flexible conduit 28 will be stretched to assume a more direct path between buoy 16 and terminal 22. The degree to which said conduit is deformed will be contingent on the position and character of the strain member 39.

As shown in FIG. 5, the latter will be stretched to the point where sufficient tension will dispose it in a relatively straight path. In either event while member 39 receives the maximum force of the displaced buoy 16, the conduit 28 will be virtually unstrained and will continue to be functional for conducting fluid between buoy 16 and the terminal 22.

As a matter of practicality the strain relieving buoy system can further embody an alarm system which indicates an excessive strain being applied thereto. This in turn will provide a warning that the normal buoy anchoring means is not functioning properly. In such an instance the loading or offloading operation can be rapidly automatically interrupted. Alternately, steps can be taken to assure that displacement of the buoy was not serious enough as to cause possible damage or rupture of the flexible conduit.

Other modifications and variations of the invention as hereinbefore set forth may be made without departing from the spirit and scope thereof, and therefore, only such limitations should be imposed as are indicated in the appended claims.

I claim:

1. In a single point mooring system for an offshore body of water wherein a buoy having a detachable coupling means floats at the water's surface, a resilient, elongated fluid carrying conduit extends dowwardly from said buoy and communicates with a subsea terminal fixedly disposed at the ocean floor, said elongated conduit being communicated with a remote source of fluid, a plurality of hold down cables spaced about said buoy having one end thereof connected to the buoy, and having the other end spaced from said subsea terminal and anchored at the ocean floor, a nonrigid restraining member extending between, and having opposed ends thereof connected to said buoy and to said subsea terminal, respectively and being shorter in length than said elongated fluid carrying conduit, and at least one buoyant member positioned on said elongated conduit having means thereon to support said conduit above the ocean floor, said buoyant member being fixedly connected to said at least one elongated conduit, and being slidably connected to said restraining member whereby to permit limited relative movement between said buoyant member and said restraining member.

2. In an apparatus as defined in claim 1, including; a plurality of spaced apart sleeve-like members depending from said nonrigid conduit, said buoyant members being fixedly connected to said sleeve member, and a linkage pivotally depending from said sleeve member and adapted to supportably engage said nonrigid restraining member.

* * * * *